No. 717,850. PATENTED JAN. 6, 1903.
H. E. HEY & H. B. CROZIER.
STIRRUP.
APPLICATION FILED MAR. 1, 1902.
NO MODEL.
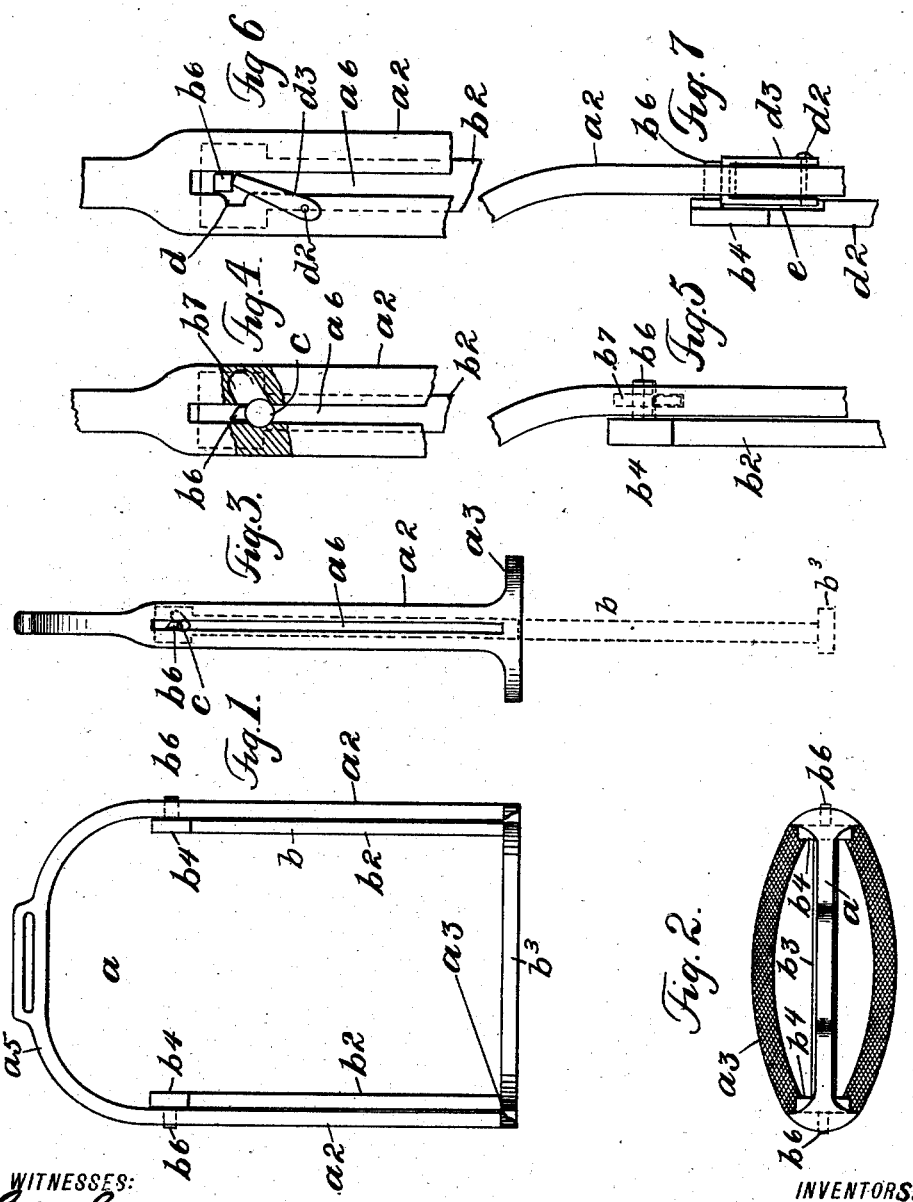
WITNESSES:
INVENTORS:
Harold E. Hey
Henry B. Crozier
BY
Edgar Tate & Co
ATTORNEYS

UNITED STATES PATENT OFFICE.

HAROLD EDMUND HEY AND HENRY BIBBY CROZIER, OF LEYLAND, PRESTON, ENGLAND.

STIRRUP.

SPECIFICATION forming part of Letters Patent No. 717,850, dated January 6, 1903.

Application filed March 1, 1902. Serial No. 96,250. (No model.)

*To all whom it may concern:*

Be it known that we, HAROLD EDMUND HEY and HENRY BIBBY CROZIER, subjects of the King of Great Britain, residing at Fox Lane Farm, Leyland, Preston, county of Lancaster, England, have invented certain new and useful Improvements in Stirrups, of which the following is a full and complete specification, such as will enable those skilled in the art to which it appertains to make and use the same.

This invention relates to stirrups such as are used in connection with saddles; and the object thereof is to provide an improved device of this class which will facilitate the mounting of a horse; and with this and other objects in view the invention consists in a stirrup constructed as hereinafter described and claimed.

In the drawings forming part of this specification, in which the separate parts of our improvement are designated by the same reference characters in each of the views, Figure 1 is a side view of a stirrup made according to our invention; Fig. 2, a top plan view thereof; Fig. 3, a side view thereof; Fig. 4, a view similar to Fig. 3 of a part of a stirrup and showing it on an enlarged scale; Fig. 5, a view of the device shown in Fig. 4 and at right angles thereto; Fig. 6, a view similar to Fig. 4, showing a modification; and Fig. 7, a view similar to Fig. 5 of the device as shown in Fig. 6.

In the practice of our invention we provide a stirrup $a$, composed of a main part and a supplemental part $b$. The main part comprises two vertically-arranged and parallel side portions $a^2$, a bottom or tread portion $a^3$, and a top portion $a^5$, and the bottom or tread portion $a^3$ is preferably elliptical in form, as shown in Fig. 2.

The side portions $a^2$ of the main part $a$ are provided with vertical slots $a^6$, and the supplemental part $b$ comprises vertical and parallel side portions $b^2$ and a bottom transverse bar $b^3$. The side portions $b^2$ of the supplemental part are passed upwardly through the bottom or tread portion $a^3$ of the main part and parallel with the side portions $a^2$ thereof and are provided at their upper ends each with a cross-head $b^4$, and these cross-heads $b^4$ in the construction shown in Figs. 1 to 5, inclusive, are provided with laterally-directed pins or projections $b^6$, which pass through the slots $a^6$ in the sides $a^2$ of the main part of the stirrup.

The pins or projections $b^6$ are beveled at the top thereof, as clearly shown in Figs. 3 and 4, and formed in the sides $a^2$ of the main part and in the opposite sides of the slots $a^6$ and near the top thereof are inclined chambers or spaces $b^7$, in each of which is mounted a disk or ball $c$, and said chambers or spaces $b^7$ are formed partly at both sides of the slot $a^6$, the said spaces or chambers extending up farther at one side than at the other.

When the disks or balls $c$ are in the position shown in Figs. 3 and 4, the supplemental part $b$ will be held in the position shown in Fig. 1 by the disks or balls $c$, and by inverting the stirrup the said disks or balls will roll into the upper ends of the chambers or spaces $b^7$, and the supplemental part may then be lowered until the cross-heads $b^4$ rest on the bottom portion $a^3$ of the main part, and in mounting a horse the foot is placed in the supplemental part of the stirrup. This renders the mounting of a horse much more easy and convenient, as the foot does not have to be raised as high as would be necessary if it were in an ordinary stirrup.

After the horse has been mounted the supplemental part of the stirrup may be raised either by the hand or by the toe of the foot, and in this operation the beveled or inclined pins or projections $b^6$ strike the disks or balls $c$ and move them up into the wider end of the chamber or recess $b^7$, and as the pins or projections $b^6$ pass above said chambers or recesses the said disks or balls drop back into the position shown in Figs. 3 and 4 and the pins or projections $b^6$ rest thereon and support the supplemental part in the position shown in Fig. 1.

In Figs. 6 and 7 we have shown a modification of this construction, in which the slots or recesses $a^6$ are provided near their upper ends and at one side with a lateral recess $d$, and pivoted to the same side of the members $a^2$ of the main part $a$, as shown at $d^2$, are links $d^3$, which are adapted to enter said notches or recesses, and in this form of construction the pins or projections $b^6$ in their upward movement turn said links so that the closed ends thereof enter said notches or recesses, after which the links drop back into the position shown in Fig. 6 and the supplemental part of the stirrup is held in its raised position thereby. In this form of construction the outer sides of the upper ends of the side members $b^2$ of the supplemental part of the stirrup are also preferably cut out to form longitudinal recesses $e$, as shown in Fig. 7, so as to accommodate the links $d^3$.

Our invention is not limited to the means herein described for holding the supplemental part of the stirrup in its raised position, as any suitable automatic device which will permit said supplemental part to be raised and locked in its raised position may be employed.

Having thus fully described our invention, what we claim as new, and desire to secure by Letters Patent, is—

1. A stirrup composed of a main and supplemental part, the main part being provided with parallel sides and an open bottom and the sides thereof being provided with longitudinal slots, the supplemental part being vertically movable, and being provided with parallel sides having outwardly-directed pins or projections at the upper ends which are movable in said slots and means for holding the supplemental part in its highest position, substantially as shown and described.

2. A stirrup composed of a main and supplemental part, the main part being provided with parallel sides and an open bottom and the sides thereof being provided with longitudinal slots, the supplemental part being vertically movable, and being provided with parallel sides having outwardly-directed pins or projections at the upper ends which are movable in said slots and means for holding the supplemental part in its highest position, consisting of locking devices connected with the sides of the main part of the stirrup and operating in connection with said pins or projections, substantially as shown and described.

3. A stirrup composed of a main and supplemental part, the main part being provided with parallel sides and open at the bottom and the sides thereof being provided with longitudinal slots, the supplemental part being vertically movable, and being provided with parallel sides having outwardly-directed pins at their upper ends which are movable in said slots, the bottom portion of the supplemental part when in its highest position being within the bottom of the main part and means for locking the supplemental part in a raised position, substantially as shown and described.

In testimony that we claim the foregoing as our invention we have signed our names, in presence of the subscribing witnesses, this 18th day February, 1902.

HAROLD EDMUND HEY.
HENRY BIBBY CROZIER.

Witnesses:
SAMUEL GODDARD,
JAMES HASLAM.